(12) United States Patent
Dang et al.

(10) Patent No.: US 7,869,401 B2
(45) Date of Patent: Jan. 11, 2011

(54) METHOD, SYSTEM AND APPARATUS OF REALIZING INDICATING RESOURCE OF MULTICAST AND BROADCAST SERVICE (MBS)

(75) Inventors: Shujun Dang, Guangdong (CN); Yuehua Chen, Guangdong (CN); Jianjun Wu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 902 days.

(21) Appl. No.: 11/742,667

(22) Filed: May 1, 2007

(65) Prior Publication Data

US 2007/0253367 A1 Nov. 1, 2007

Related U.S. Application Data

(63) Continuation-in-part of application No. PCT/CN2005/001818, filed on Nov. 1, 2005.

(30) Foreign Application Priority Data

Nov. 1, 2004 (CN) .................... 2004 1 0094523

(51) Int. Cl.
*H04Q 7/00* (2006.01)
(52) U.S. Cl. .............. 370/329; 370/312; 370/390; 455/403
(58) Field of Classification Search .......... 370/312, 370/328, 329, 336, 390, 208; 455/403, 95, 455/456.5, 424, 525, 550.1
See application file for complete search history.

(56) References Cited

U.S. PATENT DOCUMENTS 7,260,405 B2 * 8/2007 Kim et al. ............... 455/452.2

7,725,796 B2 * 5/2010 Ihm et al. ................... 714/751
2003/0223393 A1 12/2003 Lee (Continued)

FOREIGN PATENT DOCUMENTS

| EP | 1465444 A2 | 10/2004 |
|---|---|---|
| JP | 2007536790 T | 12/2007 |
| JP | 2007536791 T | 12/2007 |
| JP | 2008507937 T | 3/2008 |
| WO | 2005/109695 A1 | 11/2005 |
| WO | 2005/109696 A1 | 11/2005 |

OTHER PUBLICATIONS

Korean Office Action for Korean Patent Application No. 10-2007-7011092, dated Aug. 27, 2008, and English translation thereof.

(Continued)

*Primary Examiner*—CongVan Tran

(57) ABSTRACT

The present invention discloses a method, a system and apparatus of realizing indicating resource of MBS. The method comprises: a Down Link-MAP (DL-MAP) message sent by a Base Station (BS) carries resource information associated Multicast and Broadcast Service (MBS); receiving the DL-MAP message sent by BS, Mobile station (MS) judges whether the service information associated with MBS comprised in this message is identical to that reserved by the MS itself, if yes, the MS determines the physical channel resource occupied by MBS according to the resource information which is associated with MBS and carried in this message. The present invention also discloses another method of realizing indicating resource of MBS. The present invention solves the problem that the prior art cannot directly perform resource indication upon multicast service. Through the scheme of the present invention, position of the physical channel resource occupied by the MBS-MAP message corresponding to multicast service can be determined, and various specific positioning measures are provided thereof.

16 Claims, 11 Drawing Sheets

U.S. PATENT DOCUMENTS

| | | | |
|---|---|---|---|
| 2004/0192267 A1 | 9/2004 | Kettunen et al. | |
| 2004/0253959 A1 | 12/2004 | Hwang et al. | |
| 2004/0259495 A1 | 12/2004 | Itoh et al. | |
| 2005/0249142 A1 | 11/2005 | Kim et al. | |
| 2006/0239265 A1* | 10/2006 | Son et al. | 370/390 |
| 2008/0043656 A1* | 2/2008 | Yoon et al. | 370/311 |
| 2009/0061914 A1* | 3/2009 | Cai | 455/466 |
| 2009/0086670 A1* | 4/2009 | Hart et al. | 370/329 |
| 2009/0279480 A1* | 11/2009 | Rosenqvist et al. | 370/328 |

OTHER PUBLICATIONS

IEEE: "IEEE P802.16e/D5, Sep. 2004 Part 16: Air Interface for Fixed and Mobile Broadband Wireless Access Systems. Amendment for Physical and Medium Access Control Layers for Combined Fixed and Mobile Operation in Licensed Bands"; IEEE Wireless Man 802.16; [Online] Sep. 18, 2004; p. 1-2, 19-56, 88-96, 157-179; XP002456161; Retrieved from the Internet: URL:http://www.cs.technion.ac.il/Courses/Computer-Networks-Lab/projects/winter2005/wimax1/HTMLpage/P80216e_D5.pdf>; [retrieved on Oct. 22, 2007].

Supplementary European Search Report for European Patent Application No. 05 80 2182.5, dated Nov. 5, 2007.

Notice of Reasons for Rejection for Japanese Patent Application No. 2007-538248, dated Apr. 20, 2010, and English translation thereof.

IEEE: "IEEE Std 902.16-2004, IEEE Standard for Local and Metropolitan Area Networks; Part 16: Air Interface for Fixed Broadband Wireless Access Systems", IEEE Wireless Man 802.16; IEEE Computer Society and the IEEE Microwave Theory and Techniques Society; Sponsored by the LAN/MAN Standards Committee; Oct. 1, 2004; 892 pages.

Yong Chang, et al.; IEEE; "IEEE C802.16e-04/359r3; MBS Harmonization"; IEEE 802.16 Broadband Wireless Access Working Group; <http://ieee802.org/16>; Aug. 30, 2004; 11 pages.

European Office Action for European Patent Application No. 05802182.5, dated Jul. 24, 2008.

European Oral Proceedings for European Patent Application No. 05802182.5, dated Jun. 2, 2009.

Canadian Office Action for Canadian Patent Application No. 2586060, dated Mar. 26, 2009.

\* cited by examiner

METHOD, SYSTEM AND APPARATUS OF REALIZING INDICATING RESOURCE OF MULTICAST AND BROADCAST SERVICE (MBS)

CROSS-REFERENCE TO RELATED APPLICATIONS

This application is a continuation-in-part of International Application No. PCT/CN2005/001818 filed on Nov. 1, 2005. This application claims the benefit of Chinese Patent Application No. 200410094523.3 filed on Nov. 1, 2004. The disclosures of the above applications are incorporated herein by reference.

FIELD

The present disclosure relates to physical resource indicating technique in MBS, more particularly to a method, a system and apparatus of realizing indicating resource of Multicast and Broadcast Service (MBS).

BACKGROUND

The statements in this section merely provide background information related to the present disclosure and may not constitute prior art.

With the rapid development of Internet technology, large amounts of multimedia services have emerged, among them some application services requiring that multiple users receive the same data at the same time, namely multicasting the data, and such application services include video on demand, television broadcasting, video conference, online education, interactive games and so on.

Multicast service is the technique that can transfer the data from a data source to multiple destinations, including multicast and broadcast. As to broadcast service, in traditional mobile networks, Cell Broadcast Service (CBS) only allows transferring low speed data to all users through the shared broadcast channel of the cell, which belongs to message services. As to multicast service, there has been IP multicast technique in terms of existing IP network, but the mobile network has special network structure, function entities and wireless interfaces, which are different from those of IP network, so current IP multicast techniques are only applicable for cable IP networks while not applicable for mobile networks. In addition, compared with common services, mobile multimedia services have the characteristics such as large quantity of data, long time of duration, sensitive time delay and so on. Therefore, transmission techniques of current broadcast services and multicast services are not applicable for data transmission of mobile multimedia services.

In order to utilize mobile network resources effectively, on one hand, a Wide Code Division Multiple Access/Global System for Mobile Communications (WCDMA/GSM) global standardization organization, the Third Generation Partnership Project (3GPP), put forward Multimedia Broadcast/Multicast Service (MBMS), and Multicast and Broadcast Service (MBS) is introduced into the latest protocol IEEE802.16e/D5 by the Institute of Electrical and Electronics Engineers (IEEE) 802.16. MBMS and MBS provide the specifications of transferring the data from one data source to multiple users in the mobile network, so that the mobile network can provide point to multipoint service of transferring the data from one data source to multiple users, thereby network resources can be shared, utilization ratio of network resources is increased, and especially utilization ratio of idle interface resources is increased too. The newly provided MBMS and MBS cannot only implement multicast and broadcast of low speed messages such as plain text, but also that of high speed multimedia services, and this is obviously in trend of future mobile data development.

The network structure of MBS put forward by IEEE802.16 protocol is as shown in FIG. 1. In FIG. 1, MBS server, a mobile network function entity, is added to support MBS, MBS server acts as the entry to content providers on one hand, and on the other hand, MBS server manages multicast data transmission of underlying Base Stations (BS) as well as distributes the multicast data to the underlying BS. In addition, the function entities, such as Mobile station (MS), BS and so on, need to be enhanced by adding service functions associated with MBS service.

MBS operations mainly include the following parts: obtaining the list information of MBS, authenticating MBS and obtaining the encryption key of MBS, and receiving the MBS normally. Specifically speaking, before normally receiving MBS service, MS acquires information like MBS content list etc. from MBS server firstly, and then requests BS to authenticate the receiving of MBS content; if the authentication is passed, BS transmits information including MBS downlink service parameters and so on to MS, and then MS requests BS to return the key of MBS; upon receiving the downlink service parameters and the key of MBS, MS can receive related Media Access Control Protocol Data Unit (MAC PDU) and receive the MBS service normally.

The procedure of normally receiving MBS service mainly refers to receiving the MBS service content by using the received MBS downlink service parameters. In current standard draft, MBS downlink service parameters mainly include MBS ZONE identifier and Multicast Connection ID (Multicast CID). After the MBS downlink service parameters are obtained, physical resource indication has to be performed for MS during the service reception of MBS so as to implement the reception of MBS content.

In the latest protocol IEEE802.16e/D5 of current IEEE802.16, MBS-MAP message is introduced, which includes Information Elements (IEs) as shown in table 1.

TABLE 1

| Syntax | Size | Notes |
|---|---|---|
| MBS-MAP_Message_Format( ) { | | |
| Management Message Type = ? | 8 bits | |
| Frame number | 24 bits | The frame number is identical to the frame number in the DL-MAP |
| for (i = 0; i < n; i++) { | | |
| Multicast CID | 12 bits | 12 LSB of CID for multicast |
| Modulation and Coding | 4 bits | |

TABLE 1-continued

| Syntax | Size | Notes |
|---|---|---|
| mode (DIUC) | | |
|     OFDMA Symbol offset | 8 bits | OFDMA symbol offset with respect to start of the MBS zone |
|     Subchannel offset | 6 bits | |
|     Power Offset (Boosting) | 3 bits | 000: normal (not boosted); 001: +6dB; 010: −6dB; 011: +9dB; 100: +3dB; 101: −3dB; 110: −9dB; 111: −12dB; |
|     No. OFDMA Symbols | 7 bits | |
|     No. Subchannels | 6 bits | |
|     Repetition Coding Indication | 2 bits | 0b00 - No repetition coding<br>0b01 - Repetition coding of 2 used<br>0b10 - Repetition coding of 4 used<br>0b11 - Repetition coding of 6 used |
|     Next MBS frame offset | 8 bits | The Next MBS frame offset value is lower 8 bits of the frame number in which the BS shall transmit the next MBS frame. |
|     Next MBS OFDMA Symbol offset | 8 bits | The offset of the OFDMA symbol in which the next MBS zone starts, measured in OFDMA symbols from the beginning of the downlink frame in which the MBS-MAP is transmitted. |
|   } | | |
|   if !(byte boundary) { | | |
|     Padding Nibble | 4 bits | Padding to reach byte boundary. |
|   } | | |
| } | | |

MBS-MAP message is used to notify the physical channel resource allocated for specific Multicast CID in the given MBS ZONE. MBS-MAP message provides the modulation and coding mode (which is indicated by Downlink Interval Usage Code (UIDC)) and power offset (which is indicated by Boosting), which are used in the given physical channel resource (i.e. Burst), and position of the next service frame of MBS. Therefore, if only MBS-MAP message can be correctly detected, according to this message, MS can obtain the physical channel resource corresponding to the multicast connection, get the modulation and coding mode and power offset etc, which are used in this physical channel resource, and determine position of the next MBS frame including this multicast connection, thereby normally receive the data through the multicast connection. Therefore, while receiving the MBS service, MS can implement physical resource indication through the MBS-MAP message.

Due to the above-mentioned reasons, MS has to determine position of the MBS-MAP message when MS is receiving the MBS service initially or the service reception of MBS is desynchronized due to poorer channel quality. IEEE802.16e/D5 protocol offered one implementing mode, which is to introduce an IE, i.e. an MBS-MAP IE (MBS-MAP_IE( )) to indicate position of the MBS-MAP message, into the Downlink channel Map (DL-MAP). The structure of this MBS-MAP_IE( ) is as shown in FIG. 2. If MS detects that the MBS ZONE identifier and Multicast CID included in this IE are identical to those of the MBS service expected to be received by this MS, the MS can receive the associated MBS-MAP message at the corresponding OFDM Symbol Offset.

TABLE 2

| Syntax | Size | Notes |
|---|---|---|
| MBS_MAP_IE { | | |
|   Extended DIUC | 4 bits | MBS_MAP = 0x05 |
|   Length | 4 bits | Length = 0x03 |
|   Multicast CID | 12 bits | 12 LSB of CID for multicast |
|   MBS ZONE identifier | 7 bits | MBS ZONE identifier corresponds to the identifier provided by the BS at connection initiation |
|   OFDMA Symbol offset | 8 bits | The offset of the OFDMA symbol in which the MBS zone starts, measured in OFDMA symbols from the beginning of the downlink frame in which the DL-MAP is transmitted. |
|   Macro diversity enhanced | 1 bits | 0 = Non Macro-Diversity enhanced zone<br>1 = Macro-Diversity enhanced zone |
|   If (Macro diversity enhanced == 1){ | | |
|     Permutation | 2 bits | 0b00 = PUSC permutation<br>0b01 = FUSC permutation |

TABLE 2-continued

| Syntax | Size | Notes |
|---|---|---|
| | | 0b10 = Optional FUSC permutation |
| | | 0b11 = Adjacent subcarrier permutation |
|     ID cell | 6 bits | |
|   } | | |
|   else { | | |
|     Reserved | 8 bits | |
|   } | | |
| } | | |

It can be seen from table 2 that, only the OFDMA symbol offset, in which the MBS zone starts, is the position information of MBS-MAP message in the MBS-MAP_IE( ). As to MBS-MAP message, if just the MBS-MAP_IE( ) in DL-MAP message is indexed, because the practical physical channel resource occupied by the MBS-MAP message cannot be determined only by the information of the OFDMA symbol offset in which the MBS zone starts, thus the physical channel resource occupied by MBS cannot be determined, and then the service reception of MBS cannot be implemented.

SUMMARY

In view of above, the present invention is to provide a method and apparatus of realizing indicating resource of MBS, so as to normally receive the MBS service by initially positioning the physical channel resource occupied by the MBS-MAP message.

And the present invention is to provide a method and apparatus of realizing indicating resource of MBS, wherein less system message resource is needed for normally receiving the MBS.

According to one aspect of the invention, a method of determining the physical channel resource of the multicast and broadcast service (MBS) zone in multicast and broadcast service (MBS) system, is provided, wherein:

resource information associated with the multicast and broadcast service (MBS) zone is carried in a downlink channel MAP message (DL-MAP) sent by a base station (BS) and identifies the physical channel resource occupied by the MBS-MAP message; and a mobile station (MS) receives the downlink channel MAP message (DL-MAP) sent by base station (BS), judges whether service information associated with multicast and broadcast service (MBS) zone comprised in this downlink map message (DL-MAP) is identical to that reserved by the mobile station (MS) itself and, if yes, the mobile station (MS) determines the physical channel resource occupied by multicast and broadcast service (MBS) zone utilising said resource information which is carried in the downlink channel map (DL-MAP) message and utilising the MBS-MAP message.

According to one aspect of the invention, a method of transmitting, in a multicast and broadcast service (MBS) system, resource information and service information associated with the multicast and broadcast service (MBS) zone, is provided, wherein:

said resource information is carried in an MBS-MAP information element (MBS-MAP-IE) of a downlink channel MAP message (DL-MAP) sent by a base station (BS) and identifies the physical channel resource occupied by the MBS-MAP message; wherein the resource information comprises orthogonal frequency division multiple access (OFDMA) symbol offset, subchannel offset, Boosting, the number of OFDMA symbols and the number of subchannels occupied by the MBS-MAP message, and modulation and coding mode (DIUC) of the MBS-MAP message.

According to yet another aspect of the invention, a base station, for a cellular telecommunications system providing a multicast and broadcast service, is provided, wherein said base station is operable for transmitting resource information and service information associated with the multicast and broadcast service (MBS) zone, said resource information being carried in an MBS-MAP information element (MBS-MAP-IE) of a downlink channel MAP message (DL-MAP) sent by a base station (BS) and identifies the physical channel resource occupied by the MBS-MAP message; wherein the resource information comprises orthogonal frequency division multiple access (OFDMA) symbol offset, subchannel offset, Boosting, the number of OFDMA symbols and the number of subchannels occupied by the MBS-MAP message, and modulation and coding mode (DIUC) of the MBS-MAP message.

According to yet another aspect of the invention, a base station for use in a cellular telecommunications network is provided, which including:

(a) an input section for receiving data to be transmitted by the base station;

(b) a processing section operable for receiving data from said input section and generating downlink frames at least some of which include a traffic portion containing bursts of traffic data and a multicast/broadcast portion containing bursts of multicast/broadcast data, and (i) said multicast/broadcast portion further containing a multicast/broadcast service map message identifying, for each respective one of said bursts of multicast/broadcast data, the modulation and coding mode used therein, and (ii) said traffic portion further containing a downlink map message identifying, for each respective one of said bursts of traffic data, the modulation and coding mode used therein and identifying the position and size of the multicast/broadcast service map message, and (c) a transmitter section for transmitting said downlink frames generated by said processing section.

In the present invention, after MS determines that the service information associated with MBS included in the DL-MAP message sent by BS is identical to that reserved by the MS itself, position of the physical channel resource occupied by MBS is determined according to the resource information associated with MBS.

In the present invention, by directly setting the position information associated MBS-MAP message in the MBS-MAP_IE( ) in the DL-MAP message, position of the practical physical channel resource occupied by MBS-MAP message can be determined through the MBS-MAP_IE( ).

In the present invention, the Multicast CID field in the MBS-MAP_IE( ) can also further be deleted, so that the Multicast CID in the same MBS ZONE can share one MBS-MAP_IE( ) to decrease the load of DL-MAP message.

By setting the relative position information of the physical channel resource occupied by MBS-MAP message in the MBS ZONE, and setting the said modulation and coding mode used in the physical channel resource, the present invention can determine starting position of the MBS ZONE through the MBS-MAP_IE( ), so as to position the practical physical channel resource occupied by MBS-MAP message.

In addition, the present invention also provides an implementing scheme for sending the MBS-MAP message through Broadcast CID and for the MS to determine position of the practical physical channel resource corresponding to the received MBS-MAP message. The present invention provides multiple selections for positioning the MBS-MAP message.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
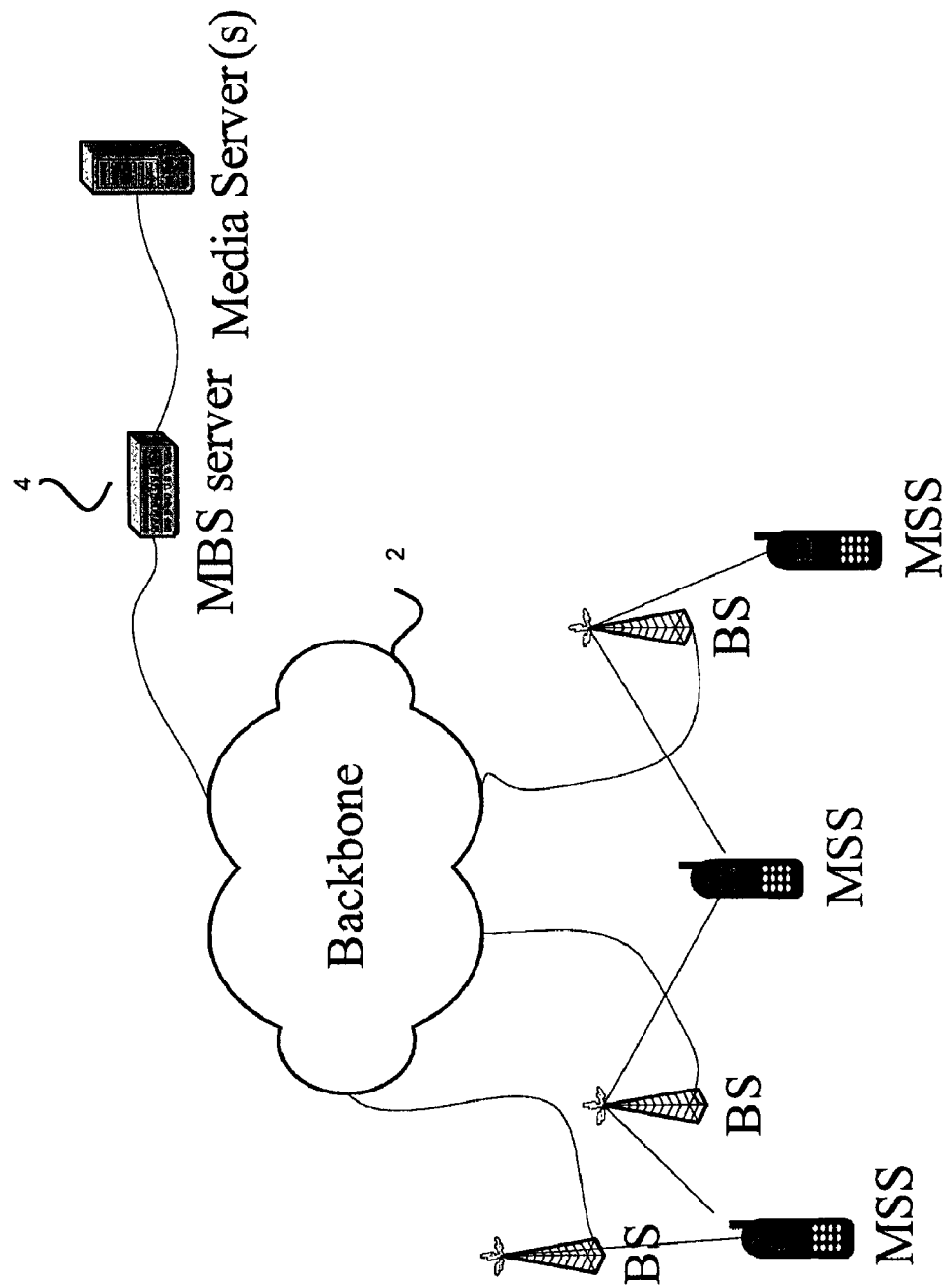
FIG. 1 is a schematic diagram illustrating the network structure of MBS service put forward in current IEEE802.16 protocol.

The following description is merely exemplary in nature and is not intended to limit the present disclosure, application, or uses. It should be understood that throughout the drawings, corresponding reference numerals indicate like or corresponding parts and features.

The scheme of the present invention will be illustrated in detail hereinafter with reference to specific embodiments.

Figure 2:
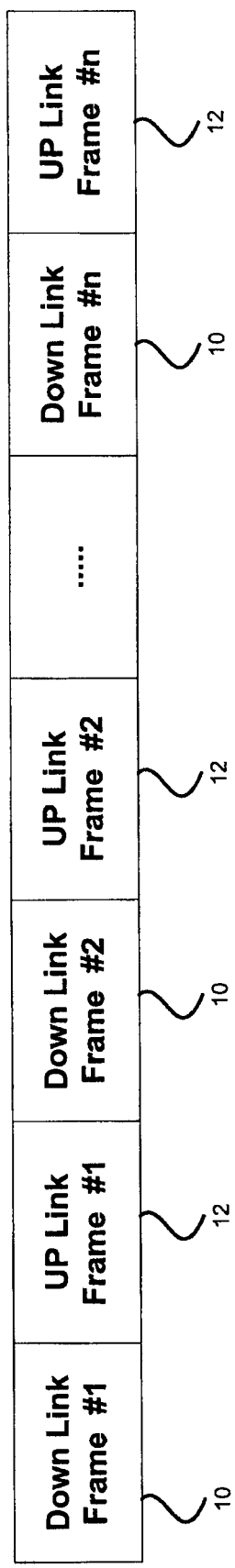
FIG. 2 is a diagram showing an example of the sequence of transmission of downlink and uplink frames respectively.

In operation of the cellular telecommunications system shown in FIG. 1, information is transmitted from the base stations BS to the mobile stations MS in a series of spaced apart downlink frames 10 as shown in FIG. 2 and information from the mobile stations MS to the base stations BS is transmitted in a series of spaced apart uplink frames 12. Also as illustrated in FIG. 2, the downlink frames 10 and uplink frames 12 are transmitted alternately.

Figure 3:
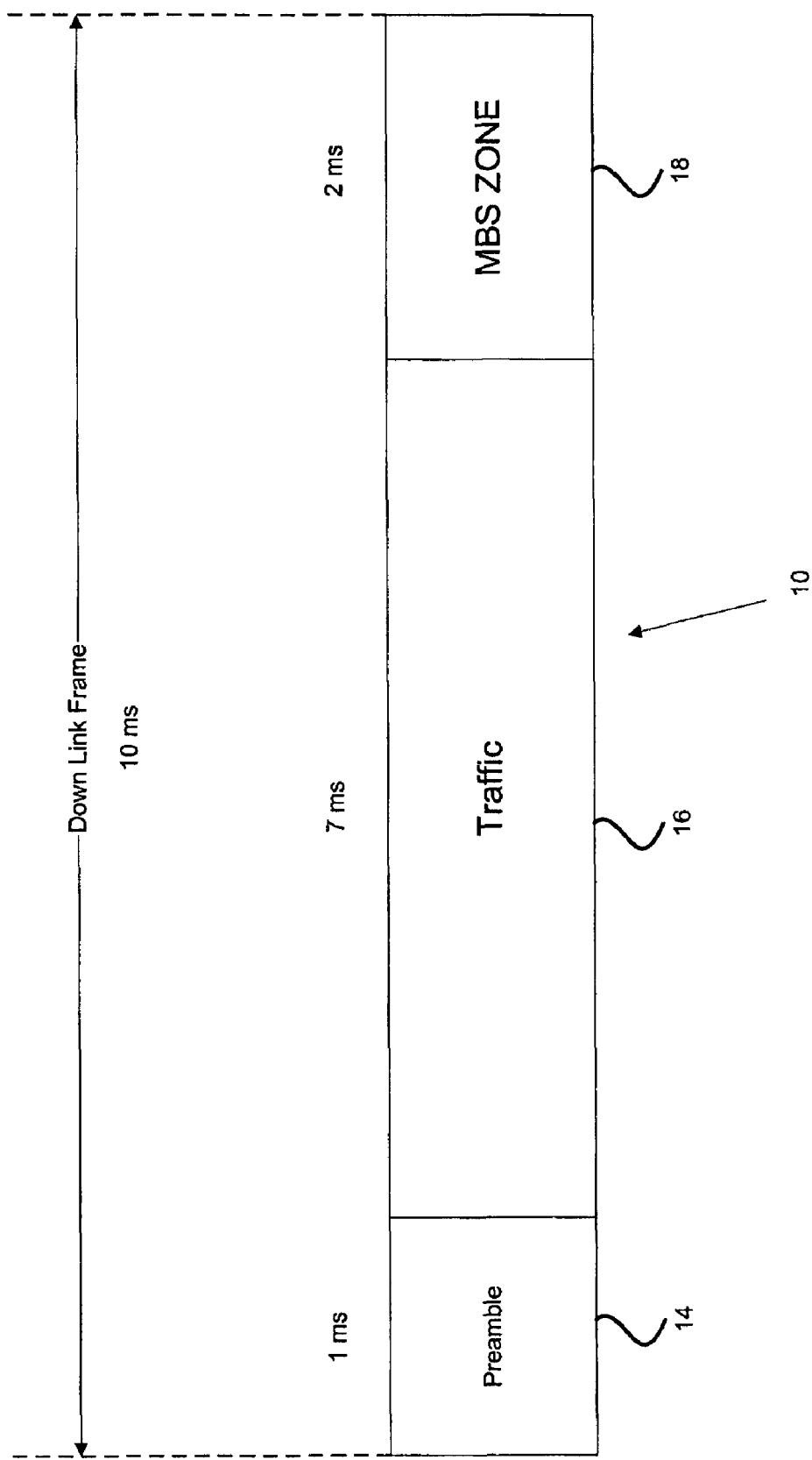
FIG. 3 is a diagram showing an example of the main components of a downlink frame.

As illustrated in FIG. 3, each downlink frame 10 is divided into three main time periods 14, 16 and 18. The time period 14, which is at the beginning of the frame, contains a conventional preamble and need not be described further. The second time period 16 immediately follows the preamble period 14 and contains traffic data, such as digital data representing voice telephone calls. The third time period 18 which is known as the MBS zone immediately follows the traffic period 16 and contains multicast and broadcast data. As shown in FIG. 3, the time periods 14, 16 and 18 may, by way of example, last respectively for 1 ms, 7 ms and 2 ms. Further, the MBS zone 18 is not necessarily present in all downlink frames.

As will be explained more fully later, the data transmitted in the traffic period 16 and the MBS zone 18 is organised in bursts which may be encoded and modulated by coding and modulation modes which may differ from one burst to another in the same downlink frame and/or may differ from one downlink frame to the next. To enable the mobile stations MS to decode and demodulate the bursts, therefore, it is necessary to transmit to the mobile station MS data identifying the modulation and coding modes which have been employed in the transmitted bursts. This data comprises a DIUC definition (downlink interval usage code definition) which lists the identities of the coding and modulation modes currently available for use in the downlink frames and a DCD count (downlink channel description) which is incremented each time the DIUC definition changes so as to notify the mobile station of this change. It also includes a downlink MAP (DL-MAP) message and an MBS-MAP message, which messages identify, for each burst, its position within the frame, its size and its modulation and coding mode.

The first embodiment of the present invention is mainly to add a field describing the specific physical channel resource occupied by the MBS-MAP message to the MBS-MAP_IE( ) in DL-MAP message, and the structure of the MBS-MAP_IE( ) with an added field is as shown in FIG. 3.

TABLE 3

| Syntax | Size | Notes |
|---|---|---|
| MBS_MAP_IE { | | |
|     Extended DIUC | 4 bits | MBS_MAP = 0x05 |
|     Length | 4 bits | Length = 0x03 |
|     Multicast CID | 12 bits | 12 LSB of CID for multicast |

TABLE 3-continued

| Syntax | Size | Notes |
|---|---|---|
| MBS ZONE identifier | 7 bits | MBS ZONE identifier corresponds to the identifier provided by the BS at connection initiation |
| OFDMA Symbol offset | 8 bits | The offset of the OFDMA symbol in which the MBS ZONE starts, measured in OFDMA symbols from the beginning of the downlink frame in which the DL-MAP is transmitted. |
| Subchannel offset | 6 bits | |
| Power Offset (Boosting) | 3 bits | 000: normal (not boosted); 001: +6dB; 010: −6dB; 011: +9dB; 100: +3dB; 101: −3dB; 110: −9dB; 111: −12dB; |
| No. OFDMA Symbols | 7 bits | |
| No. Subchannels | 6 bits | |
| DIUC | 4 bits | |
| Repetition Coding Indication | 2 bits | 0b00 -No repetition coding<br>0b01 -Repetition coding of 2 used<br>0b10 -Repetition coding of 4 used<br>0b11 -Repetition coding of 6 used |
| Macro diversity enhanced | 1 bits | 0 = Non Macro-Diversity enhanced zone<br>1 = Macro-Diversity enhanced zone |
| If (Macro diversity enhanced == 1){ | | |
| Permutation | 2 bits | 0b00 = PUSC permutation<br>0b01 = FUSC permutation<br>0b10 = Optional FUSC permutation<br>0b11 = Adjacent subcarrier permutation |
| ID cell | 6 bits | |
| }<br>else {<br>Reserved | 8 bits | |
| }<br>} | | |

Compared with the original MBS-MAP_IE( ), the MBS-MAP_IE( ) shown in FIG. 3 mainly adds Subchannel offset, Boosting, No. of OFDMA Symbols, No. of Subchannels and DIUC, wherein these pieces of information together with OFDMA Symbol offset can uniquely determine position of the physical channel resource occupied by the MBS-MAP message as well as the used modulation and coding mode. When MS detects that Multicast CID and MBS ZONE identifier in the MBS-MAP_IE( ) of DL-MAP message are identical to the ones which the MS expects to receive, MS can directly obtain the position of corresponding MBS-MAP message, and then obtain the physical channel resource allocated for corresponding "Multicast CID" from the MBS-MAP message, thereby the multicast messages can be normally received.

Therein Multicast CID and/or MBS ZONE identifier are service information associated with MBS; MBS-MAP message includes the service information associated with MBS.

Therefore, in the described embodiment, position of the physical channel resource occupied by the MBS-MAP message can be determined by using the MBS-MAP_IE( ) and then MBS service can be normally received.

Besides, the described first embodiment can be further improved to provide the second embodiment of the present invention by deleting the Multicast CID field in the MBS-MAP_IE( ). As MBS MAP message and MBS ZONE are corresponding to each other, if MS detects that the MBS ZONE identifier in the MBS-MAP_IE( ) is identical to the one that the MS expects to receive, MS can determine that the relevant position information in the MBS-MAP message of this IE is the needed position information.

Since MBS-MAP message can carry multiple Multicast CIDs, DL-MAP message needs to carry multiple MBS-MAP_IE( ) accordingly, but the Multicast CID field is deleted in the second embodiment of the present invention, so the Multicast CID in the same MBS ZONE can share one MBS-MAP_IE( ), so that the load of DL-MAP message is decreased.

The third embodiment is implemented mainly based on the corresponding relation between MBS ZONE and MBS-MAP message. At present, positioning the MBS ZONE can be implemented through the MBS-MAP_IE( ) in the DL-MAP message, but MBA-MAP message and MBS ZONE are corresponding to each other, therefore, this embodiment firstly specifies the subchannel defining manner (Permutation and IDCELL) used in MBS ZONE, the relative position of the specific physical channel resource occupied by the MBS-MAP message in MBS ZONE as well as the used modulation and coding mode. Wherein, this physical channel resource specifically includes subchannels and OFDMA symbols. For instance, it can be specified that the first to the fourth OFDM symbol in MBS ZONE as well as the first to the third subchannel are used to transfer the MBS-MAP messages after the defining mode of a subchannel is specified.

With respect to the above setting, MS determines the position information of the MBS ZONE according to the OFDMA Symbol offset in the MBS-MAP_IE( ) at first after receiving the DL-MAP message, and then determines the physical channel resource according to the relative position of this physical channel resource occupied by the MBS-MAP message in the MBS ZONE. Wherein, the relative position information of the physical channel resource in the MBS ZONE includes: OFDMA Symbol offset, subchannel offset, No. of the OFDMA symbols and No. of the subchannels.

Thus, the three embodiments of the invention which have been described above provide three different ways of defining by information in the DL-MAP message the position and size of the MBS-MAP message (that is to say the channel resource occupied by the MBS-MAP message). An implementation of the first of these embodiments will now be described with reference to FIGS. 4 to 9, and implementations of the second and third embodiments will be described with reference to FIGS. 10 and 11.

Figure 4:
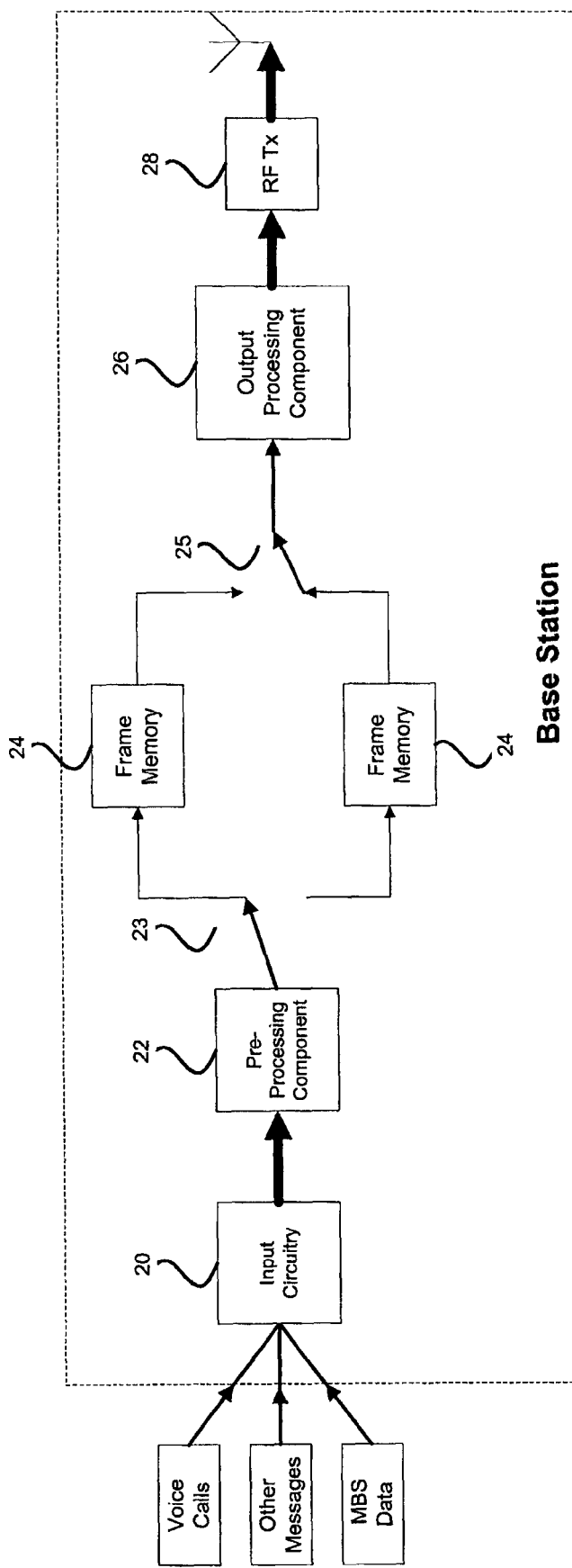
FIG. 4 is a simplified block diagram of a base station, illustrating frame memories in which the data is assembled before transmission.

With reference to FIG. 4, the base station BS includes input circuitry 20 for receiving data from the backbone 2 or another source or sources such as the up-layer or Internet, preprocessing components 22 for preprocessing the received data and supplying it to first and second frame memories 24, and output processing components 26 which receive data from the frame memories 24 and prepare it for transmission by a radio-frequency transmitter 28. The components 22 and 26 may be implemented in hardware and/or software as appropriate. The data received from the backbone 2 will in practice originate from a variety of sources but will typically comprise MBS data from the MBS server 4, data representing voice calls and data representing other messages. The preprocessing components 22 include an encoder and an interleaver so that, as is conventional, the data provided to each frame memory 24 is in the form of interleaved digital data symbols. These symbols are assembled in the frame memories 24 in a manner such that the downlink frames 10 are formed when the symbols are read out and processed by the components 26 in preparation for transmission. The arrangement is such that, as indicated by the arrows 23 and 25 in FIG. 4, while data from the preprocessing components 22 is being read into and assembled in one of the frame memories 24, data previously assembled in the other is read out to the output processing components 26.

Figure 5:
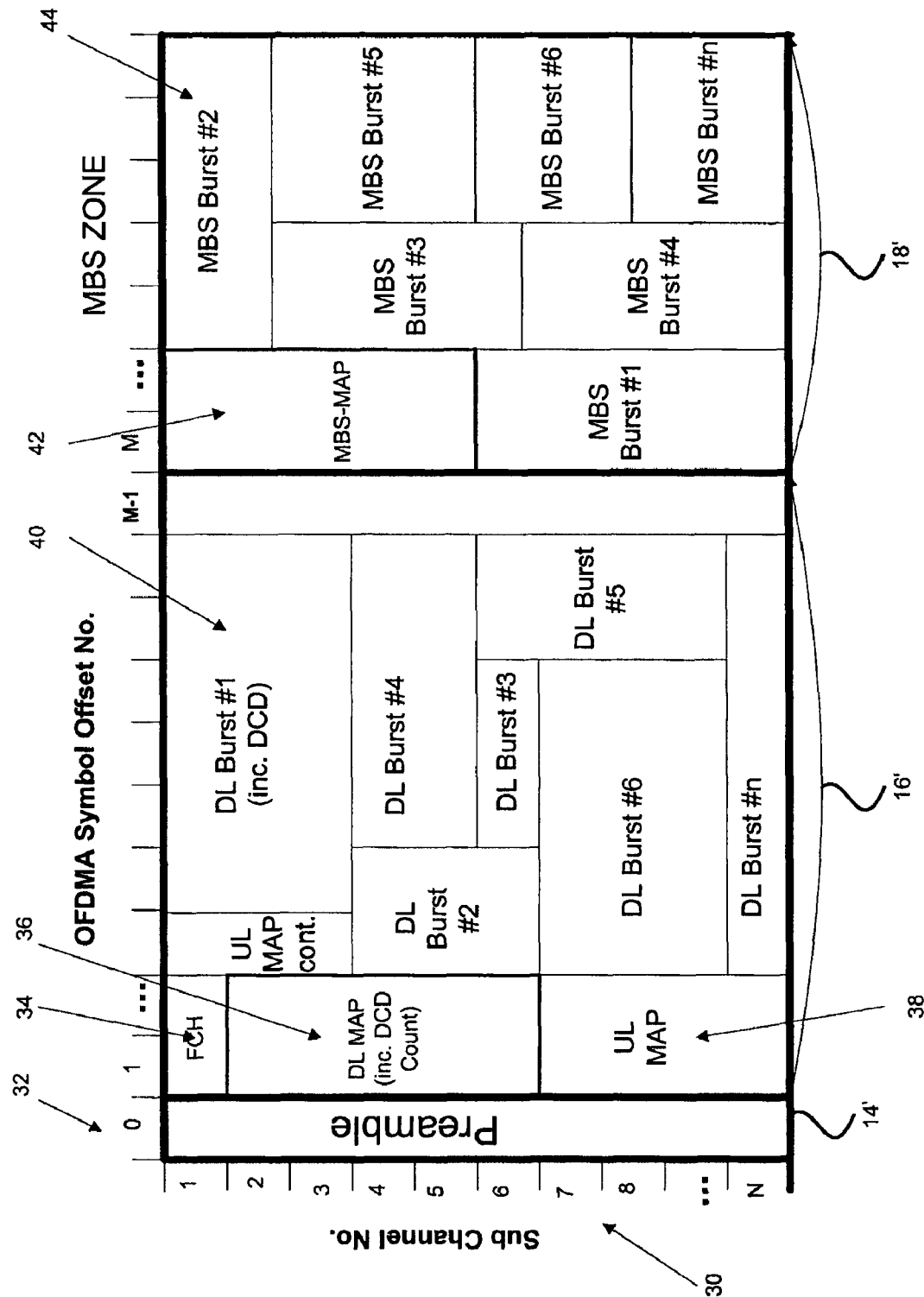
FIG. 5 is a diagram showing the arrangement of data as stored in the frame memories in the base station illustrated in FIG. 4.

Each frame memory 24 comprises a plurality of memory cells, each for containing a single data symbol, arranged in rows 30 and columns 32 as shown in FIG. 5, to form a rectangular array. The position of any data symbol within the frame memory 24 can accordingly be defined by identifying the row 30 and the column 32 at the intersection of which the relevant memory cell is located. As shown in FIG. 5, the rows are actually referred to as "subchannels". This is because the output processing components 26 of the base station BS carry out an inverse fast Fourier transform such that each row is assigned to a different subchannel. As also shown in FIG. 5, the columns 32 are referred to as OFDMA (orthogonal frequency division multiple access) symbol offset numbers. Thus, the position of each data symbol can be defined by its subchannel number and its OFDMA symbol offset number.

The data symbols which constitute the preamble, the traffic and the MBS data are assembled in each frame memory 24 in three segments thereof labelled respectively 14', 16' and 18' for consistency with FIG. 3. The segment 14' is shown as occupying a single column corresponding to OFDMA symbol number 0, the segment 16' is shown as occupying the columns corresponding to OFDMA symbol numbers 1 to M−1, and the segment 18' is shown as occupying the columns from OFDMA symbol number M onwards. As already indicated, the preamble is conventional and need not be described further.

The segment 16' contains, in the first few columns, a frame control header 34, a downlink map (DL-MAP) 36 and an uplink map 38. The remainder of the segment 16' is occupied by a number of data bursts 40, the first of which identified as DL burst 1 contains a downlink channel description (DCD) message and the remainder of which contain traffic such as voice call data.

The segment 18', identified as the MBS zone, contains an MBS-MAP message 42 and a number of data bursts 44.

To enable the mobile stations MS to decode the bursts 40 and 44 it is necessary for the mobile stations to receive information which defines the position and size of each burst and the modulation and coding mode used for the burst. The subset of modulation and coding modes currently available for use in the bursts 40 and 44 is defined in the downlink channel description (DCD) message which is contained in the first of the bursts 40 in segment 16' of the frame memory 24. The position and size of each burst 40 within the frame memory 24 is defined within the downlink DL-MAP message 36 and the position and size of each burst 44 is defined in the MBS-MAP message 42. The DL-MAP message 36 and the MBS-MAP message 42 also contain information for identifying, with the aid of the DCD message, the coding modulation mode used for each different burst 40 and 44 respectively.

Figure 6:
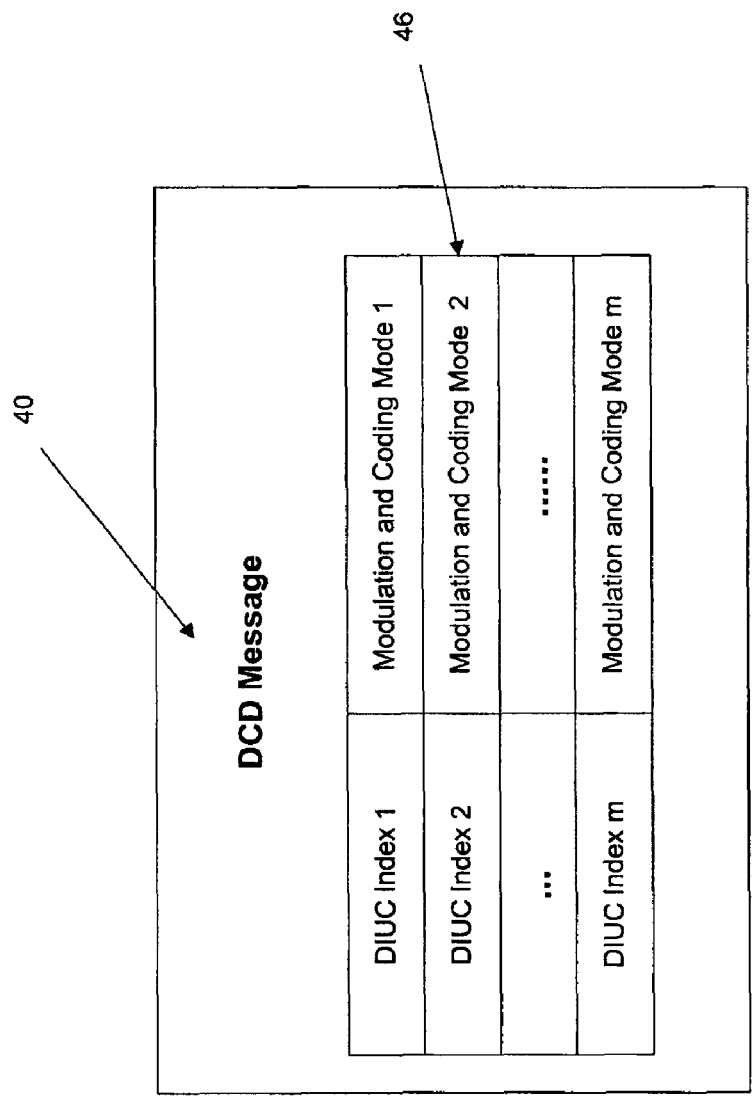
FIG. 6 is a diagram showing downlink channel description (DCD) message included in the data illustrated in FIG. 5.

As shown in FIG. 6, the DCD message is in the form of a look-up table 46 contains a list of the identities of the currently available modulation and coding modes, identified as mode 1, mode 2 . . . etc and, next to the identity of each mode, the DIUC index number which relates to it.

Figure 7:
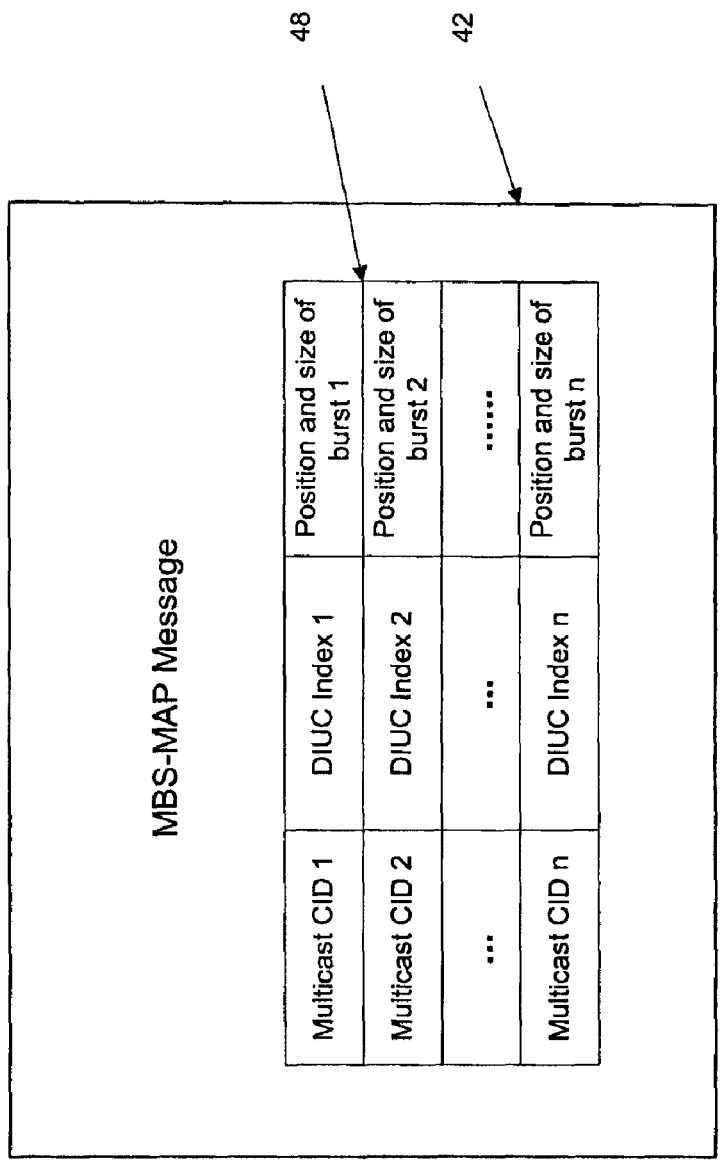
FIG. 7 is a diagram showing an MBS-MAP message included in the data illustrated in FIG. 5.

As shown in FIG. 7, the MBS-MAP message 42 comprises a table 48 having a number of lines each corresponding to a respective different one of the bursts 44. Each line of the table 48 contains:

(a) the multicast CID (connection identifier) of the burst;

(b) the position and size of the burst defined as described above by the position of the top left-hand corner of the burst (as seen in FIG. 5) in terms of OFDMA symbol offset and subchannel number and the number of subchannels and OFDMA symbols over which it extends; and (c) the downlink interval usage code (DIUC) index number which identifies the coding and modulation mode used for the burst.

Thus, the receiver, when processing the MBS-MAP message, uses the DIUC index number relating to each burst contained in the table 48 to obtain, from the look-up table 46, the identity of the modulation mode for the burst.

Figure 8:
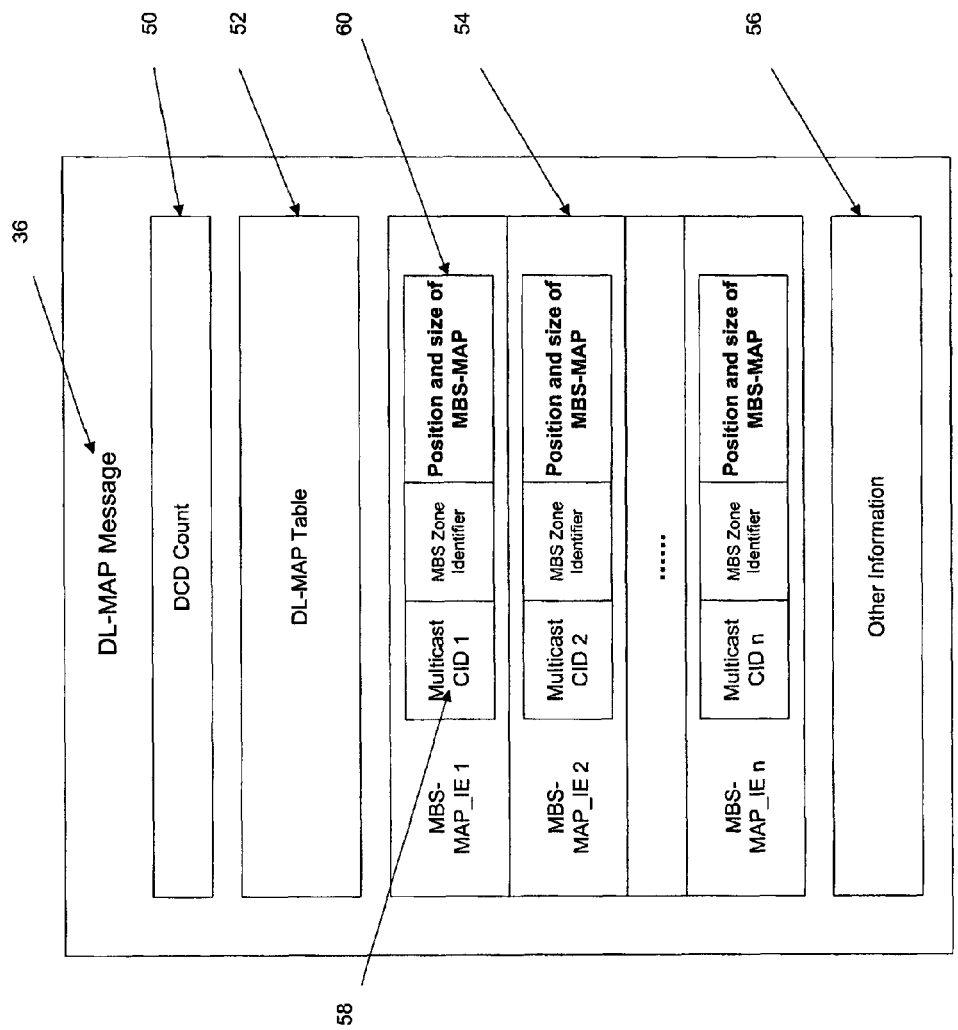
FIG. 8 is a diagram showing a downlink map (DL-MAP) message according to a first embodiment of the invention, included in the data illustrated in FIG. 5.
Figure 9:
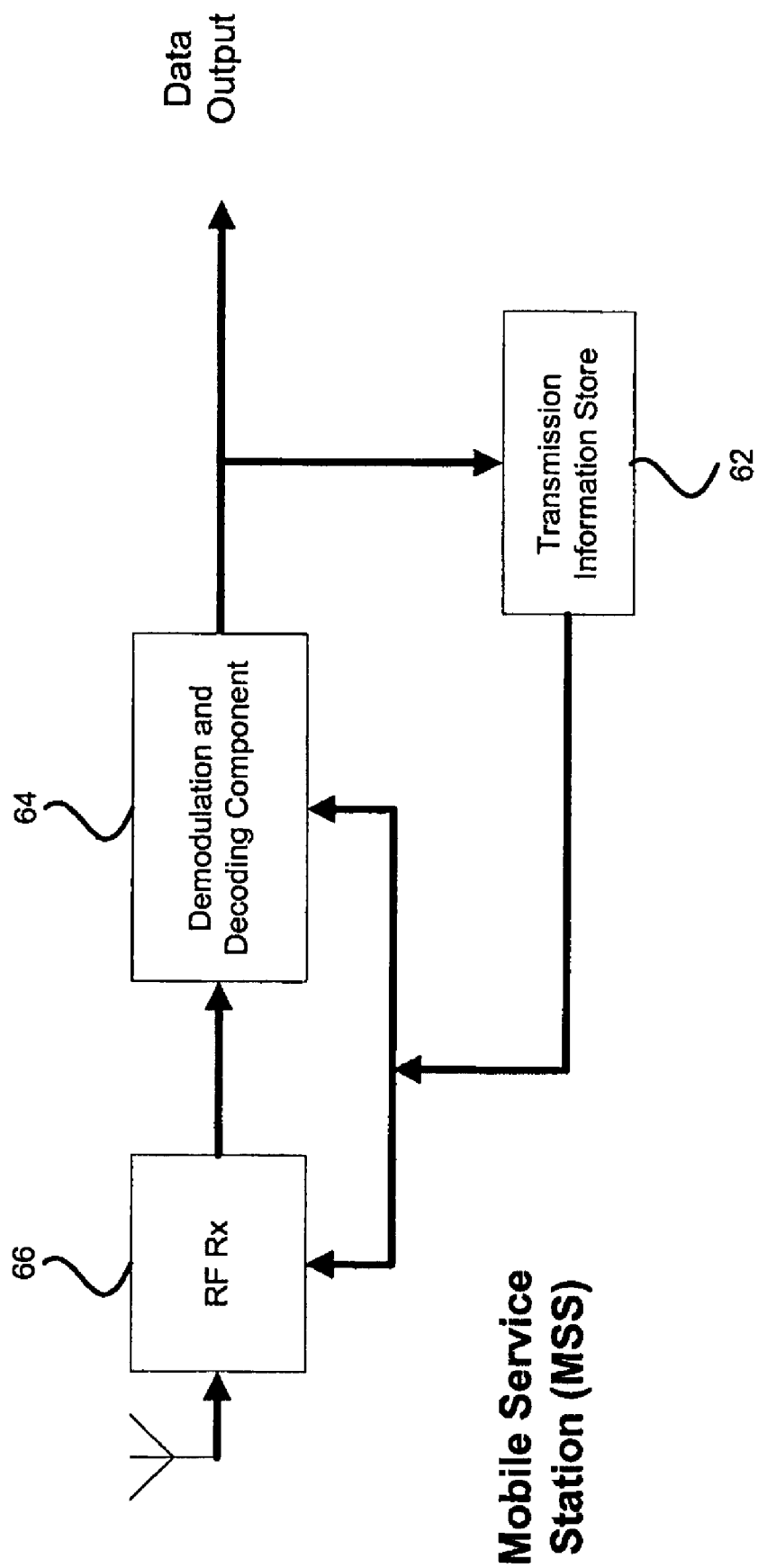
FIG. 9 is a simplified block diagram of the main components of a mobile station for receiving downlink frames constructed as illustrated in FIGS. 5, 6, 7 and 8.

As shown in FIG. 8, the DL-MAP message comprises a DCD count 50 which is a value that is incremented each time the subset of available coding modulation modes is changed, a DL-MAP table 52, which is similar to the table 48 illustrated in FIG. 7 relates to the bursts 40 stored in segment 16' of the frame memory 24 and therefore need not be described in further detail, and a table 54 which is for identifying the position and size of the MBS-MAP message. As shown in FIG. 8, the table 54 contains the multicast CID (connection identifier) 58 and MBS zone identifier for each of the bursts 44 in the MBS zone and the position and size of the MBS-MAP message indicated by reference number 60 defined by the subchannel number and OFDMA symbol offset number of the top left-hand corner of the MBS-MAP message (as seen in FIG. 5) and the number of subchannels and OFDMA symbols over which it extends. The multicast CID 58 and the position and size of the MBS-MAP 60, as previously described, are contained in the MBS-MAP information element (IE).

Because the size of the MBS-MAP message, in addition to its position, is defined in the DL-MAP message, the actual size of the MBS-MAP message from frame to frame can be varied, taking into account the number of bursts 44 in the MBS zone, which also may vary from frame to frame.

Accordingly, by varying the size of the MBS-MAP message, the use of the available channel resources may be optimised.

As shown in FIG. 8, the mobile stations MS include a transmission information store 62 which stores the DCD count 50, the DL-MAP table 52 and the MBS-MAP message 42 received from demodulation and decoding component 64 which utilises the information in table 54 in order to identify the position and size of the MBS-MAP message in the received frames. The information stored in the transmission information store 62 is used to control the demodulation and decoding components 64 and an RF section 66, so that the data in the downlink frames can be correctly monitored and demodulated and decoded.

Figure 10:
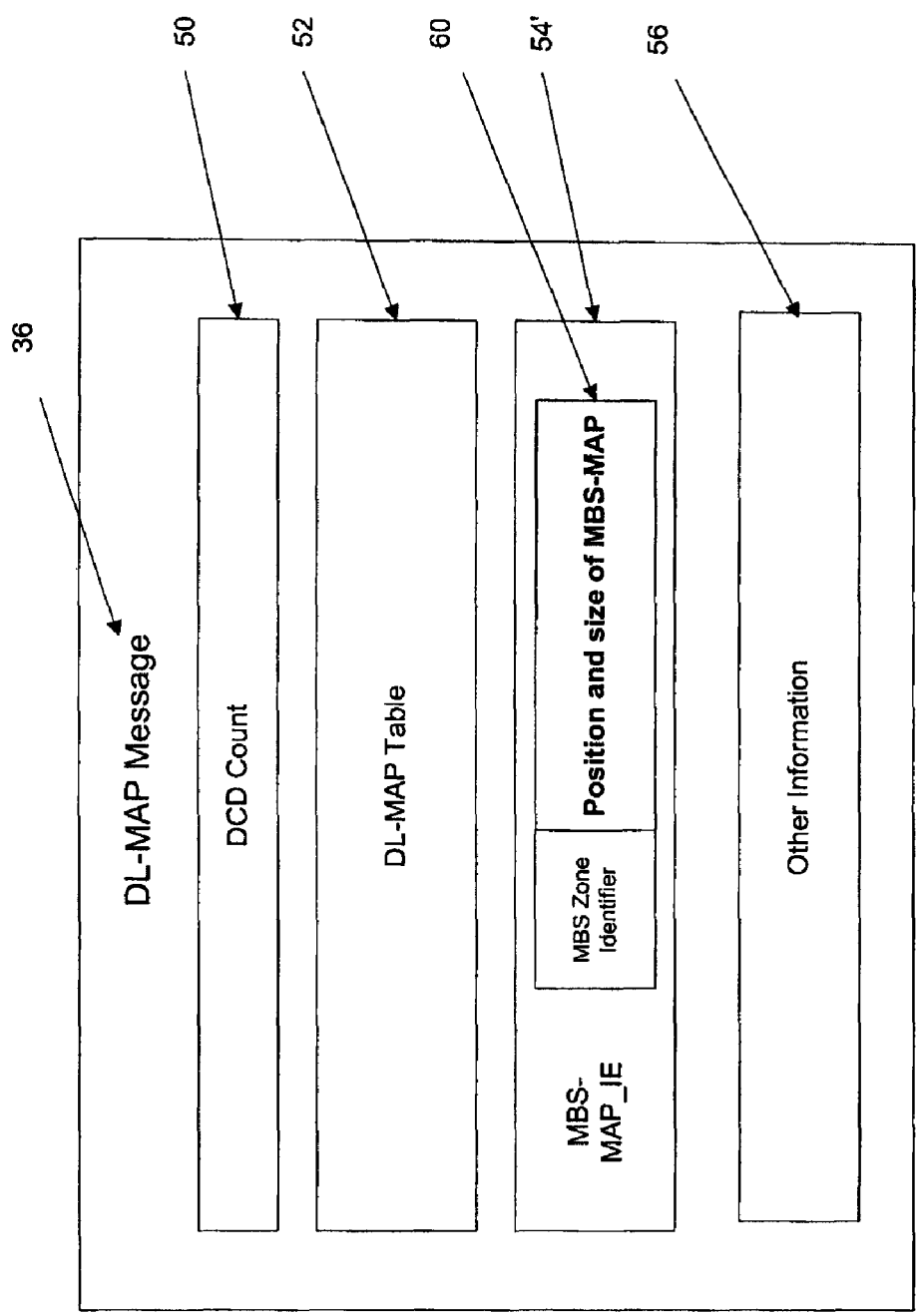
FIG. 10 is a diagram, similar to FIG. 8, showing a downlink map (DL-MAP) message according to a second embodiment of the invention.

With reference to FIG. 10, the DL-MAP message 36 of the second embodiment of the invention is the same as that illustrated in FIG. 8 except that instead of the table 54, a simplified table 54' is provided. In the simplified table 54' shown in FIG. 10, the definition of the position and size of the MBS-MAP 60 appears only once and consequently the multicast CID's are omitted. This is possible because the multicast CID simply identifies the different bursts in the MBS zone and, regardless of which burst is to be received and decoded and demodulated, the position and size of the MBS-MAP within the MBS zone does not change. Accordingly, the DL-MAP message 36 of FIG. 10 takes up less space in the frame memory 24 than that shown in FIG. 8, thereby saving channel resources.

Figure 11:
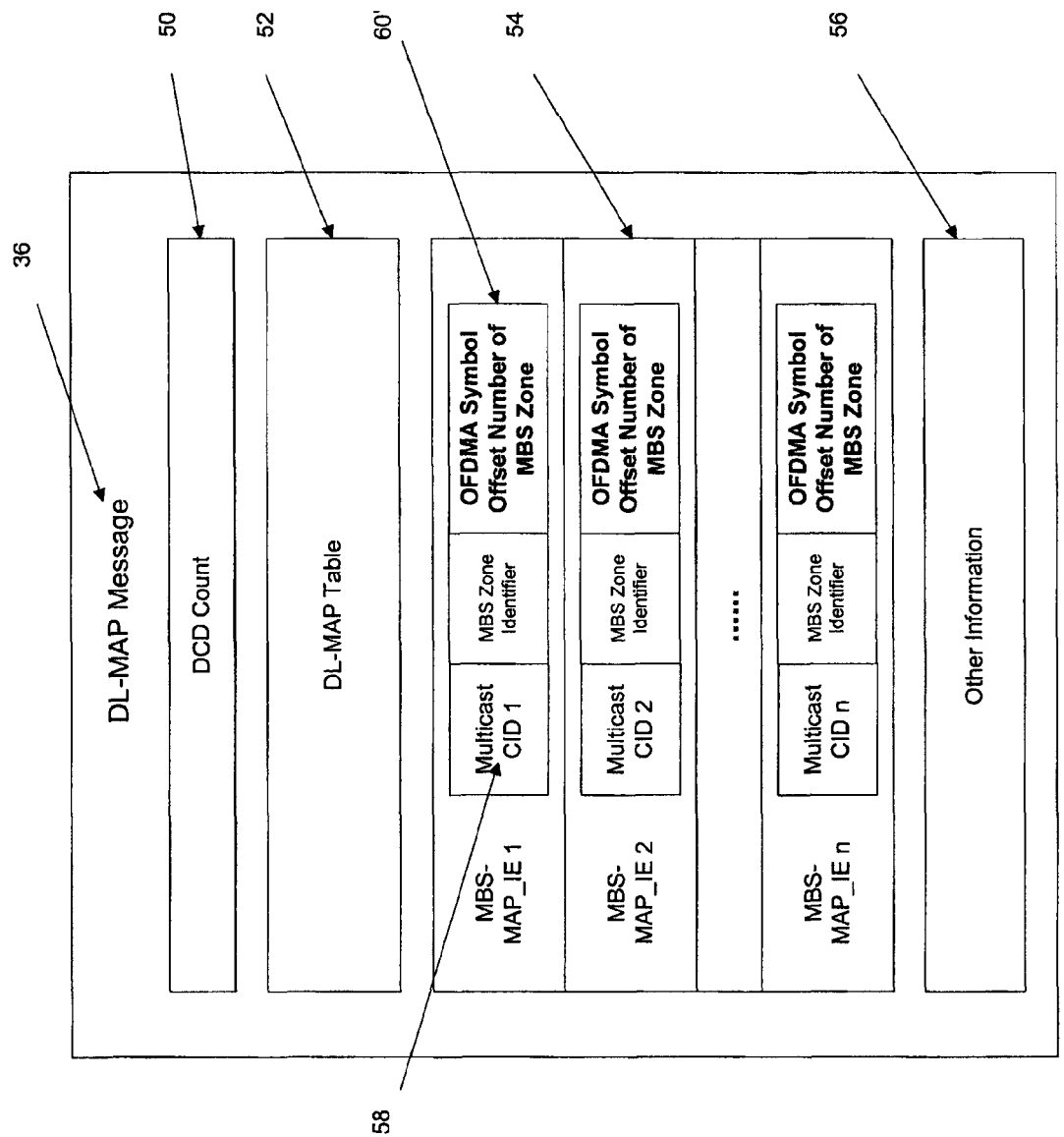
FIG. 11 is a diagram, similar to FIG. 8, showing a downlink map (DL-MAP) message according to a third embodiment of the invention.

With reference to FIG. 11, the DL-MAP message 36 of the third embodiment of the invention is the same as the DL-MAP message shown in FIG. 8 except that, instead of the data 60 which represents (in addition to size), the position of the MBS-MAP in absolute terms within the frame memory 24 (that is to say its position relative to the top left memory cell as seen in FIG. 5) data 60' is provided which represents the OFDMA symbol offset number of the starting position of the MBS zone. In this embodiment, it is assumed that the position and size of the MBS-MAP in the MBS zone will be standardised so that this information does not have to be transmitted in the downlink frames but will be provided by other means to the mobile stations.

In a further alternative embodiment, the DL-MAP message could be as illustrated in FIG. 10 but with the information defining the position and size of the MBS-MAP omitted and replaced with the OFDMA symbol offset number of the starting position of the MBS zone. As with the embodiment of FIG. 11, it is assumed that in this case also the position and size of the MBS-MAP in the MBS zone will be standardised so that this information does not have to be transmitted in the downlink frames but will be provided by other means to the mobile stations and in particular may be prestored therein, for example in hardware, firmware and/or software.

A fourth embodiment of the preset invention is to send the MBS-MAP message through Broadcast CID, of course, the launching position of the MBS-MAP message should be specified in the relevant IE in the DL-MAP message beforehand, so that BS can send the MBS-MAP message through this launching position, wherein the relevant IE of the DL-MAP message can be DL-MAP IE (DL-MAP_IE( )). Since MS receives the information carried by all Broadcast CIDs, if detecting the type of a message is identical to that of MBS-MAP message, MS will determine this message as an MBS-MAP message, and the MS receiving the MBS-MAP message can certainly determine the position of the MBS-MAP message.

The above are just the preferred embodiments of the present invention, and should not be used to confine the protection scope of the present invention, as detailed by the claim hereinafter.

What is claimed is:

1. A method for use in a multicast and broadcast service (MBS) system, comprising:
transmitting by a base station (BS), resource information and service information associated with a multicast and broadcast service (MBS) zone to a mobile station,
wherein:
said resource information is carried in an MBS-MAP information element (MBS-MAP-IE) of a downlink channel MAP message (DL-MAP);
said resource information identifies a physical channel resource occupied by a MBS-MAP message; and
said resource information comprises an orthogonal frequency division multiple access (OFDMA) symbol offset, a subchannel offset, a power offset (Boosting), number of OFDMA symbols, number of subchannels occupied by the MBS-MAP message, and a modulation and coding mode (DIUC) of the MBS-MAP message.

2. The method according to claim 1, wherein said service information comprises a multicast and broadcast service (MBS) zone identifier.

3. The method according to claim 2, wherein said service information further comprises a multicast connection identifier (Multicast CID).

4. The method according to claim 2, wherein the MBS-MAP-IE is shared by more than one Multicast connection identifier (CID) in the same MBS zone, and the MBS-MAP-IE does not include a Multicast CID field.

5. The method according to claim 1, wherein said resource information uniquely defines a position of the physical channel resource occupied by the MBS-MAP message.

6. The method according to claim 1, wherein said resource information defines a relative position of the physical channel resource occupied by the MBS-MAP message in the multicast and broadcast service (MBS) zone.

7. The method according to claim 6, wherein the OFDMA symbol offset in the MBS-MAP-IE of the downlink channel map message (DL-MAP) is used for determining a starting position of the MBS zone.

8. The method according to claim 1, wherein the mobile station (MS) receives the downlink channel MAP message (DL-MAP) sent by the base station (BS), judges whether the service information associated with the multicast and broadcast service (MBS) zone comprised in the MBS-MAP-IE is identical to that the mobile station (MS) expects to receive, if yes, the mobile station (MS) determines the physical channel resource occupied by the multicast and broadcast service (MBS)-MAP message utilizing the resource information.

9. A base station in a cellular telecommunications system for providing a multicast and broadcast service,
wherein said base station is configured to transmit resource information and service information associated with a multicast and broadcast service (MBS) zone to a mobile station, said resource information is carried in an MBS-MAP information element (MBS-MAP-IE) of a downlink channel MAP message (DL-MAP) and identifies a physical channel resource occupied by a MBS-MAP message; and
wherein the resource information comprises an orthogonal frequency division multiple access (OFDMA) symbol offset, a subchannel offset, a power offset (Boosting), number of OFDMA symbols and number of subchannels occupied by the MBS-MAP message, and a modulation and coding mode (DIUC) of the MBS-MAP message.

10. The base station according to claim 9, wherein the service information comprises a multicast and broadcast service (MBS) zone identifier.

11. The base station according to claim 10, wherein the service information further comprises a multicast connection identifier (Multicast CID).

12. The base station according to claim 10, wherein the MBS-MAP-IE is shared by more than one Multicast connection identifier (CID) in the same MBS zone, and the MBS-MAP-IE does not include a Multicast CID field.

13. The base station according to claim 9, wherein said resource information uniquely defines a position of the physical channel resource occupied by the MBS-MAP message.

14. The base station according to claim 9, wherein said resource information defines a relative position of the physical channel resource occupied by the MBS-MAP message in the multicast and broadcast service (MBS) zone.

15. The base station according to claim 14, wherein the OFDMA symbol offset in the MBS-MAP-IE of the downlink map message (DL-MAP) is used for determining a starting position of the MBS zone.

16. A base station in a cellular telecommunications network, comprising:
(a) an input section, configured to receive data to be transmitted by the base station;
(b) a processing section, configured to receive data from said input section and generate downlink frames, wherein at least some of the downlink frames include a traffic portion containing bursts of traffic data and a multicast/broadcast portion containing bursts of multicast/broadcast data, wherein
(i) said multicast/broadcast portion further comprises a multicast/broadcast service map message identifying, for each respective one of said bursts of multicast/broadcast data, a modulation and coding mode used therein, and
(ii) said traffic portion further comprises a downlink map message identifying, for each respective one of said bursts of traffic data, a modulation and coding mode used therein and identifying a position and a size of the multicast/broadcast service map message,
and
(c) a transmitter section, configured to transmit said downlink frames generated by said processing section.

* * * * *